United States Patent
Nakakuki

[11] Patent Number: 6,160,593
[45] Date of Patent: Dec. 12, 2000

[54] IMAGE SIGNAL PROCESSING APPARATUS

[76] Inventor: Toshio Nakakuki, 1258-6, Ushiki, Hozumi-cho, Motosu-gun, Gifu-ken 501-0234, Japan

[21] Appl. No.: 09/219,259

[22] Filed: Dec. 22, 1998

[30] Foreign Application Priority Data

Dec. 25, 1997 [JP] Japan ................................. 9-357474

[51] Int. Cl.[7] .................................................. H04N 9/64
[52] U.S. Cl. ........................ 348/713; 348/223; 348/624; 348/279; 348/655; 348/649
[58] Field of Search ................................... 348/223, 225, 348/256, 266, 272, 235, 234, 237, 279, 71, 708, 713, 488, 493, 624, 630, 655, 649, 599; 382/162, 167; 358/518

[56] References Cited

U.S. PATENT DOCUMENTS

| | | | |
|---|---|---|---|
| 4,635,107 | 1/1987 | Nakayama | 348/708 |
| 4,805,011 | 2/1989 | Sase | 348/237 |
| 4,963,978 | 10/1990 | Ueda et al. | 348/655 |
| 5,012,331 | 4/1991 | Schuster | 348/630 |
| 5,124,785 | 6/1992 | Hirose et al. | 348/649 |
| 5,258,826 | 11/1993 | Wakeland et al. | 348/488 |
| 5,481,302 | 1/1996 | Yamamoto et al. | 348/655 |
| 5,504,821 | 4/1996 | Kanamori et al. | 348/708 |
| 5,508,742 | 4/1996 | Geerlings et al. | 348/279 |
| 5,510,850 | 4/1996 | Ueda et al. | 348/649 |
| 5,581,298 | 12/1996 | Sasaki et al. | 348/279 |
| 5,696,840 | 12/1997 | Usami | 382/167 |
| 5,949,482 | 9/1999 | Kawa | 348/649 |

*Primary Examiner*—Victor R. Kostak

[57] ABSTRACT

An image signal processor generates color difference output signals from color component signals representative of image data. The image signal processor includes multiple color calculators that generate multiple sets of primary color signals from the color component signals. Multiple color difference calculators connected to the color calculators generate multiple sets of color difference signals using the respective sets of primary color signals. A synthesizing circuit combines the multiple sets of color difference signals using a predefined ratio to generate the color difference output signals. By generating multiple sets of signals, errors due to noise can be filtered and higher quality images produced.

6 Claims, 5 Drawing Sheets

| | | | | | | |
|---|---|---|---|---|---|---|
| D (ODD) | G (1) | W (1) | G (2) | W (2) | G (3) | W (3) |
| D (EVEN) | Ye (1) | Cy (1) | Ye (2) | Cy (2) | Ye (3) | Cy (3) |
| C[Ye] | Ye (1) | Ye (1) | Ye (2) | Ye (2) | Ye (3) | Ye (3) |
| C[Cy] | Cy (0) | Cy (1) | Cy (1) | Cy (2) | Cy (2) | Cy (3) |
| C[G] | G (1) | G (1) | G (2) | G (2) | G (3) | G (3) |
| C[W] | W (0) | W (1) | W (1) | W (2) | W (2) | W (3) |

| | | | | | | |
|---|---|---|---|---|---|---|
| D (ODD) | W (1) | Ye (1) | W (2) | Ye (1) | W (3) | Ye (3) |
| D (EVEN) | Cy (1) | Mg (1) | Cy (2) | Mg (2) | Cy (3) | Mg (3) |
| C [Ye] | Ye (0) | Ye (1) | Ye (1) | Ye (2) | Ye (2) | Ye (3) |
| C [Cy] | Cy (1) | Cy (1) | Cy (2) | Cy (2) | Cy (3) | Cy (3) |
| C [Mg] | Mg (0) | Mg (1) | Mg (1) | Mg (2) | Mg (2) | Mg (3) |
| C [W] | W (1) | W (1) | W (2) | W (2) | W (3) | W (3) |

IMAGE SIGNAL PROCESSING APPARATUS

BACKGROUND OF THE INVENTION

1. Field of the Invention

The present invention relates to an image signal processing apparatus, and, more particularly, to an image signal processing apparatus that produces color difference signals from an image signal containing a plurality of color components output from a solid state image sensing device.

2. Description of the Related Art

Figure 1:
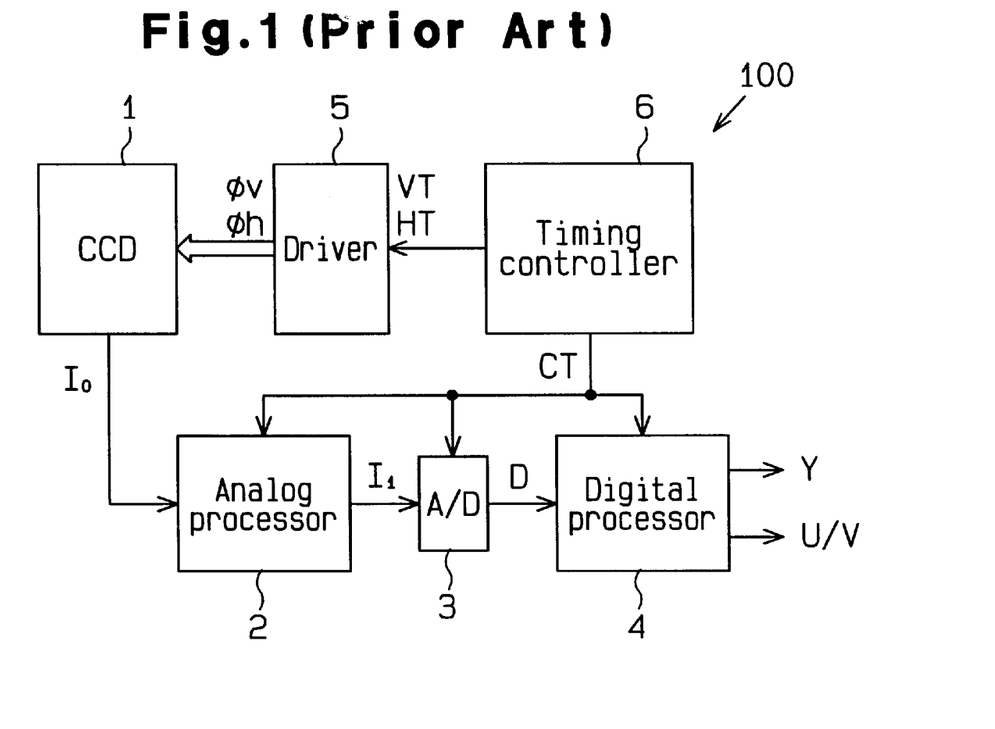
FIG. 1 is a schematic block diagram of a conventional image sensing apparatus.

FIG. 1 is a schematic block diagram of a conventional image sensing apparatus 100 having a CCD image sensor 1.

The CCD image sensor 1 has a plurality of light-receiving pixels, a plurality of vertical transfer shift registers and a single horizontal shift register. The light-receiving pixels, which are arranged in a matrix form on the light-receiving surface of the image sensor 1, produce and store information charges corresponding to the image of a sensed object (hereinafter the "target object"). The vertical shift registers sequentially shift the information charges, stored in the light-receiving pixels, in the vertical direction column by column. The horizontal shift register receives the information charges, transferred from the vertical shift registers, and outputs, row by row, an image signal I0 having a voltage corresponding to the information charges.

An analog processor 2 performs a process, such as sampling and holding or level clamping, on the image signal I0 from the CCD 1 to generate an image signal I1 of a predetermined format. For example, the image signal I0 has reset levels and signal levels alternately repeated in synchronism with the output operation of the CCD 1. In the sample and hold process, only an image signal having a signal level is extracted. The image signal I0 has a black reference level set every time the horizontal scan period ends. In the level clamping process, the black reference level of the image signal I0 is clamped to a predetermined level every time the horizontal scan period ends.

An A/D converter 3 performs A/D conversion of the image signal I1 from the analog processor 2. Specifically, the A/D converter 2 quantizes the image signal I1 in synchronism with the operation of the analog processor 2 (i.e., the output operation of the CCD 1) to produce image data D having a digital value corresponding to the information charges in each light-receiving pixel of the CCD 1.

A digital processor 4 performs a process, such as color separation or matrix operation, on the image data D from the A/D converter 3, to generate luminance data Y and color difference data U and V. For example, a color filter having colors arranged in a predetermined manner may be attached to the light-receiving surface of the CCD 1. In the color separation, the image data D is separated according to the arranged colors, producing a plurality of color component data. In the matrix operation, primary color data corresponding to the three primary colors of light are produced from the individual color component data, and are then combined by a predetermined ratio, thereby generating the color difference data U and V.

In accordance with a reference clock having a given period, a timing controller 6 generates a vertical timing signal, which determines the timing of vertical scanning of the CCD 1, and a horizontal timing signal, which determines the timing of horizontal scanning. The timing controller 6 controls the operations of the analog processor 2, the A/D converter 3 and the digital processor 4 by a timing clock CT. The timing clock CT is a signal for synchronizing the operations of the individual circuits 2 to 4 with the output operation of the CCD 1.

A driver 5 supplies a multi-phase drive clock to each shift register of the CCD 1 in accordance with the vertical and horizontal timing signals from the timing controller 6. For example, a 4-phase vertical transfer clock $\psi v$ is supplied to the vertical shift registers, and a 2-phase horizontal transfer clock $\psi h$ is supplied to the horizontal shift register.

In carrying out color image sensing, attaching a color filter for color separation to the light-receiving surface allows the individual light-receiving pixels of the CCD 1 to be associated with predetermined color components. There are a mosaic type color filter and a stripe type color filter. While the mosaic type color filter has a more complicated structure than the stripe type, it is advantageous over the stripe type in having a higher horizontal resolution. In this respect, it is preferable to use the mosaic type color filters in an image sensing apparatus that needs a high resolution, like a video camera.

Figure 2:
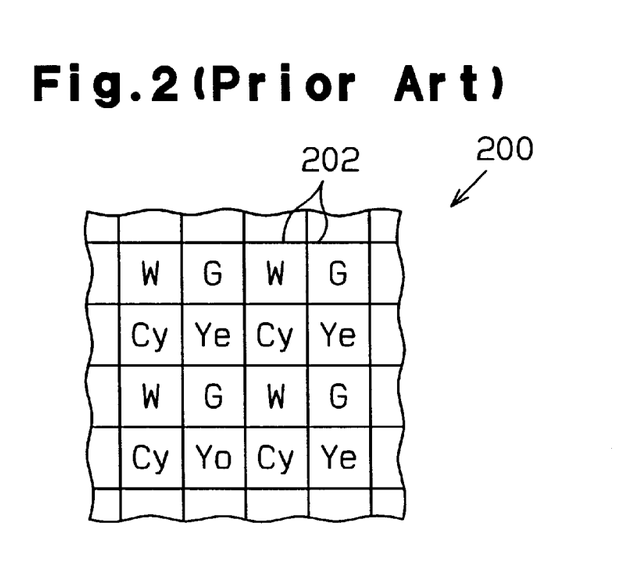
FIG. 2 is a schematic plan view of a part of a color filter attached to the light-receiving surface of a CCD in the image sensing apparatus.

FIG. 2 is a schematic plan view of a part of a mosaic type color filter 200. The color filter 200 has a plurality of segments 202 corresponding to the individual pixels of the light-receiving section of the CCD 1. For example, Ye (Yellow), Cy (Cyan), W (White) and G (Green) are cyclically assigned to the individual segments 202. In the example of FIG. 2, the W components and G components are alternately arranged in odd rows, while the Ye components and Cy components are alternately arranged in even rows. In the CCD image sensor 1 equipped with the color filter 200, an image signal having the alternate W and G components is output when odd rows of pixel information are read out, and an image signal having the alternate Ye and Cy components is output when even rows of pixel information are read out.

Figure 3:
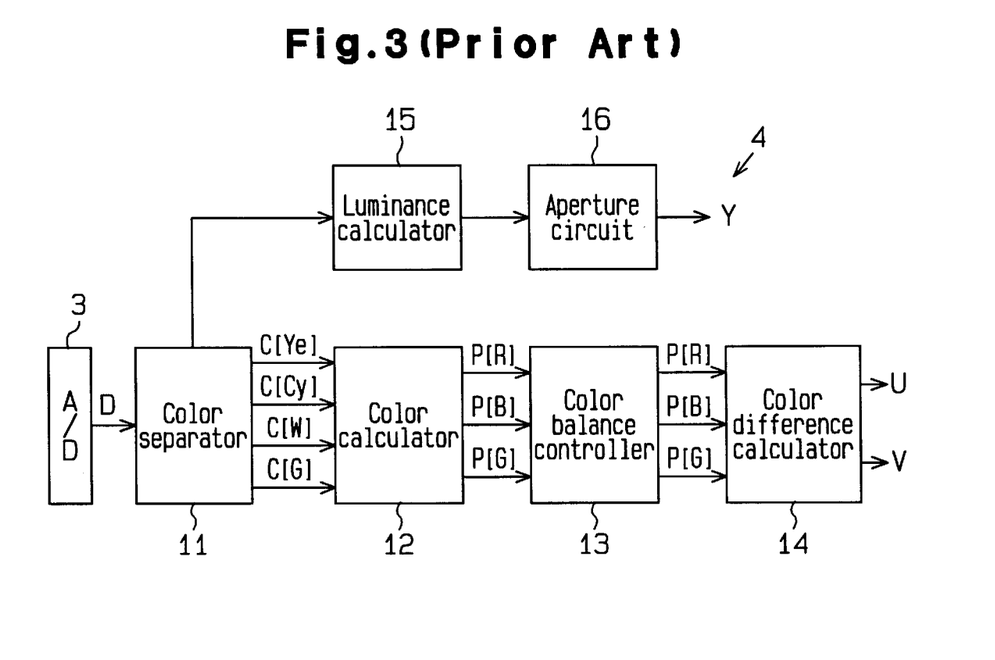
FIG. 3 is a schematic block diagram of a conventional video signal processing apparatus.

FIG. 3 is a schematic block diagram of the digital processor 4 used as an image signal processing apparatus. It is assumed in this case that the CCD image sensor 1 is equipped with the color filter 200 shown in FIG. 2.

Figure 4:
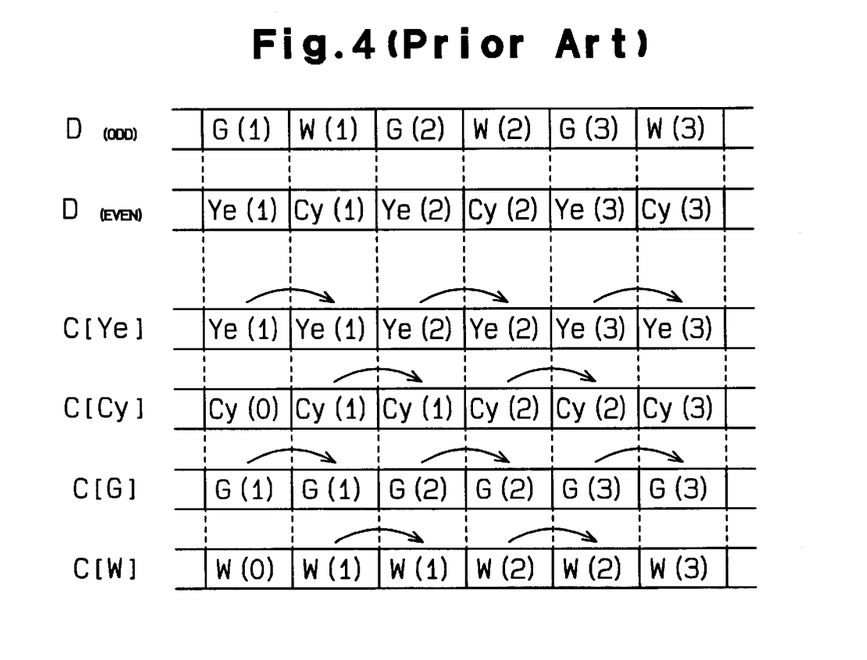
FIG. 4 is a timing chart for processing image data using the color filter of FIG. 2.

A color separator 11 receives the image data D output from the A/D converter 3 in accordance with the arrangement order of the color components of the color filter 200, and separates the image data D color component by color component to generate color component data C[Ye], C[Cy], C[G] and C[W]. As shown in FIG. 4, the image data D having the alternate W components and G components is output in an operation of reading odd rows of pixel information, and the image data D having the alternate Ye components and Cy components is output in an operation of reading even rows of pixel information. The color separator 11 outputs all of the color component data C[Ye], C[Cy], C[G] and C[W] at the time of each row of pixel information is read by retaining at least one row of image data D. Specifically, during reading of an odd row, the color separator 11 separates the odd row of image data D into the color component data C[G] and C[W] and at the same time separates the previously read even row of image data D into the color component data C[Ye] and C[Cy]. This scheme causes the color component data to be output intermittently at the time of outputting the image data serially. The intermittent portions of the color component data are however interpolated by outputting the same color component data twice in succession.

A color calculator 12 performs a color computation according to, for example, the following equations on the color component data C[Ye], C[Cy], C[G] and C[W] from the color separator 11, to generate primary color data P[R], P[B] and P[G] corresponding to the three primary colors (R: red, B: blue and G: green) of light.

Ye−G=R

Cy−G=B

G=G

A color balance controller 13 receives the primary color data P[R], P[B] and P[G] from the color calculator 12 and adjusts the color balance of the individual primary color data using predetermined gains specific to the respective primary colors. This adjustment compensates for differences among the sensitivities of the light-receiving pixels of the CCD image sensor 1 which differ color component by color component data, resulting in an improved color reproduction of the reproduced image.

A color difference calculator 14 produces color difference data U and V from the primary color data P[R], P[B] and P[G] from the color balance controller 13. The color difference calculator 14 combines the primary color data P[R], P[B] and P[G] by a ratio of 3:6:1 to generate luminance data. Then, the color difference calculator 14 subtracts the luminance data from the primary color data P[B] corresponding to the B component to generate the color difference data U. Further, the color difference calculator 14 subtracts the luminance data from the primary color data P[R] corresponding to the R component to generate the color difference data V.

A luminance calculator 15 combines the four color components Ye, Cy, G and W included in the image data D from the color separator 11 to generate luminance data Y. That is, Y=Ye+Cy+G+W=(B+G)+(R+G)+G+(R+G+B) =2R+4G+2B is produced. The luminance data Y results from combination of the R, G and B components by a ratio of 1:2:1. While a luminance signal is generated by combining the R, G and B components by a ratio of 3:6:1 according to the NTSC standards, a ratio close to this ratio does not raise a practical problem.

An aperture circuit 16 enhances a specific frequency component included in the luminance data Y to generate aperture data, and adds this aperture data to the luminance data Y to enhance the outline of the image of a target object. In other words, the aperture circuit 16 performs a filtering process on the image data D to produce aperture data in which the frequency component of ¼ of the sampling frequency (which is used to acquire the image data D from the image signal Y) is enhanced. The luminance data Y modified by the aperture circuit 16 is supplied together with the color difference data U and V to an external display device or recording device (not shown).

As the process of generating the R and B components and the process of generating the G component in the color computation of the color calculator 12 differ from each other, the color components may vary due to the influence of noise, resulting in degradation of the quality of the reproduced image. When noise is contained in all the Ye, Cy, G and W color components, for example, the noise components are canceled out by the subtracting process at the time of producing the R and B components. At the time of producing the G component, however, the noise components remain. Therefore, the G component is most likely to be affected by noise. When the image of an object is sensed under a low brightness, the influence of noise is enhanced and prominently appears in the reproduced image.

To suppress the influence of noise, it has been proposed to change the color computing scheme of the color calculator 12 as follows. The color component data C[Ye] is subtracted from the color component data C[W] to produce the primary color data P[R]. The color component data C[Cy] is subtracted from the color component data C[W] to produce the primary color data P[B]. Further, the color component data C[Ye] and the color component data C[Cy] are added together, and then the color component data C[W] is subtracted from the added data to produce the primary color data P[G]. According to this scheme, since the color component data C[W] has a higher level than the other color components based on the characteristics of the color filter, noise components contained in the primary color data do not stand out.

Since the W component has a high light-receiving sensitivity, it will reach a saturation level more easily than the other color components. At the time of image-sensing an object under a high brightness, therefore, the R and B components become insufficient. That is, the R and B components generated using the saturated W component have lower levels than the actual R and B components. Further, the G component is acquired by subtracting the W component from the result of adding the Ye and Cy components. If the W component is saturated, then, the G component has a greater level than the actual G component. Consequently, the G component alone is enhanced, leaving the reproduced image with a poor color balance. This narrows the dynamic range of the image sensing device, thereby restricting the optical system.

It is an objective of the present invention to provide an image signal processing apparatus that suppresses the influence of noise in low brightness and maintains a good color balance in high brightness.

SUMMARY OF THE INVENTION

In One aspect of the invention, an image signal processing apparatus is provided for generating color difference output signals using a plurality of color component signals. The apparatus includes a first color calculator for performing a first color computation on the plurality of color component signals to generate first primary color signals corresponding to three primary colors of light. A second color calculator performs a second color computation on the plurality of color component signals to generate second primary color signals corresponding to the three primary colors of light. A first color difference calculator generates first color difference signals using the first primary color signals. A second color difference calculator generates second color difference signals using the second primary color signals. A synthesizing circuit combines the first color difference signals and the second color difference signals by predetermined ratios, color component by color component, to generate the color difference output signals.

In another aspect of the invention, an image signal processing apparatus is provided for generating color difference output signals using a plurality of color component signals. The apparatus includes a plurality of color calculators for performing a plurality of color computations on the plurality of color component signals to generate plural sets of primary color signals, each set corresponding to three primary colors of light. A plurality of color difference calculators generate plural sets of color difference signals using the plural sets of primary color signals. A synthesizing circuit combine the plural sets of color difference signals by predetermined ratios, color component by color component, to generate the color difference output signals.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 5:
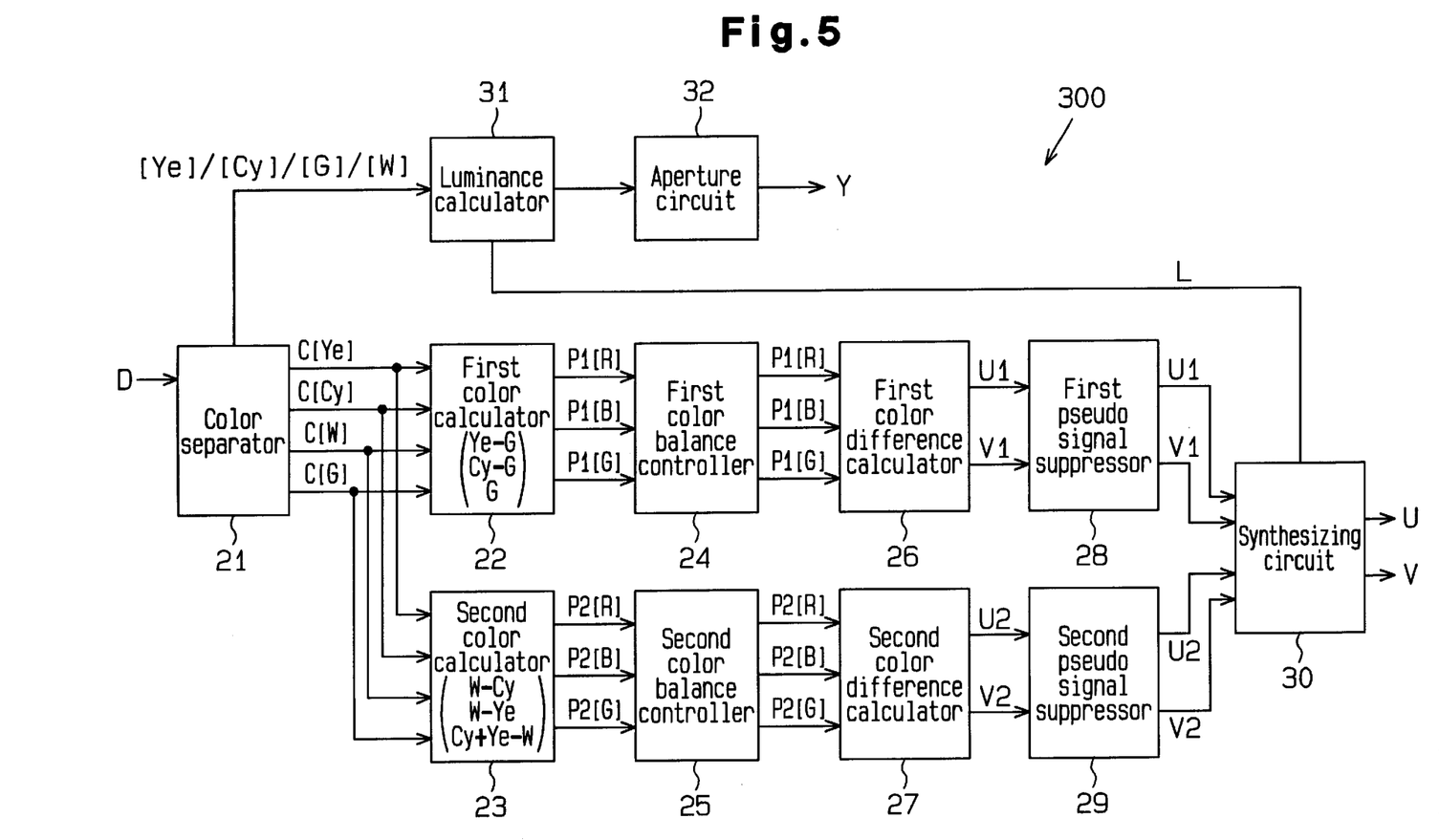
FIG. 5 is a schematic block diagram of an image signal processing apparatus according to one embodiment of the present invention.

FIG. 5 is a block diagram of an image signal processing apparatus 300 according to a presently preferred embodiment of the present invention. The image signal processing apparatus 300 includes a color separator 21, which receives image data D identical to the image data D input to the conventional image signal processing apparatus of FIG. 3, first and second color calculators 22 and 23, first and second color balance controllers 24 and 25, first and second color difference calculators 26 and 27, first and second pseudo signal suppressors 28 and 29, a synthesizing circuit 30, a luminance calculator (intensity detector) 31 and an aperture circuit 32.

The color separator 21 separates the image data D color component by color component and generates color component data C[Ye], C[Cy], C[G] and C[W]. The image data D has a series of alternate G components and W components at the time of reading odd rows of pixel information, and has a series of alternate Ye and Cy components at the time of reading even rows of pixel information. At the time of reading an odd row, the color separator 21 separates the odd row of image data D and outputs the color component data C[G] and C[W] and at the same time separates a previously read even row of image data D, and outputs the color component data C[Ye] and C[Cy]. The color separator 21 substantially simultaneously outputs all the color component data C[Ye], C[Cy], C[G] and C[W] at the time of reading each row of pixel information by retaining at least one row of image data D.

The first color calculator 22 performs a first color computation on the color component data C[Ye], C[Cy], C[G] and C[W] from the color separator 21 to generate primary color data P1[R], P1[B] and P1[G] corresponding to the three primary colors of light. The first color computation is carried out as follows.

Ye−G=R

Cy−G=B

G=G

That is, the primary color data P1[R] indicating the R component is generated by subtracting the color component data C[G] representing the G component from the color component data C[Ye] representing the Ye component. The primary color data P1[B] indicating the B component is generated by subtracting the color component data C[G] from the color component data C[Cy] representing the Cy component. The primary color data P1[G] representing the G component is the color component data C[G], which is output without modification.

The second color calculator 23 performs a second color computation, different from the first color computation, on the color component data C[Ye], C[Cy], C[G] and C[w] from the color separator 21 to generate primary color data P2[R], P2[B] and P2[G] corresponding to the three primary colors of light. The second color computation is carried out as follows.

W−Cy=R

W−Ye=B

Ye+Cy−W=G

That is, the primary color data P2[R] indicating the R component is generated by subtracting the color component data C[Cy] from the color component data C[W] representing the W component. The primary color data P2[B] indicating the B component is generated by subtracting the color component data C[Ye] from the color component data C[W]. The primary color data P2[G] representing the G component is generated by subtracting the color component data C[w] from a value obtained by adding the color component data C[Cy] and the color component data C[Ye].

The first color balance controller 24 adjusts the color balance of the individual colors by giving specific gains to the respective primary color data P1[R], P1[B] and P1[G] from the first color calculator 22. The second color balance controller 25 adjusts the color balance of the individual colors by giving specific gains to the respective primary color data P2[R], P2[B] and P2[G] from the second color calculator 23. The specific gains are previously set for the respective colors. By individually setting the gains for the primary color data P1[R], P1[B], P1[G], P2[R], P2[B] and P2[G], differences among the sensitivities of the light-receiving pixels of the image sensing apparatus are compensated, thus improving the color reproduction of the reproduced image.

The first color difference calculator 26 produces luminance data by combining the first primary color data P1[R], P1[B] and P1[G] from the first color balance controller 24 by a ratio of 3:6:1. The first color difference calculator 26 subtracts the luminance data from the first primary color data P1[B] corresponding to the B component to generate color difference data U1, and subtracts the luminance data from the first primary color data P1[R] corresponding to the R component to generate color difference data V1.

The first color difference calculator 26 may produce first color difference data U1 (U1=−0.3P1[R]−0.6P1[G]+0.9P1[B]) by combining the first primary color data by a ratio of −3:−6:9 and produce first color difference data V1 (V1= 0.7P1[R]−0.6P1[G]−0.1P1[B]) by combining the first primary color data by a ratio of 7:−6:−1. This method reduces the computation step of the first color difference calculator 26.

The second color difference calculator 27 produces luminance data by combining the second primary color data P2[R], P2[B] and P2[G] from the second color balance controller 25 by a ratio of 3:6:1. The second color difference calculator 27 subtracts the luminance data from the second primary color data P2[B] corresponding to the B component to generate color difference data U2, and subtracts the luminance data from the second primary color data P2[R] corresponding to the R component to generate color difference data V2.

The second color difference calculator 27 may produce second color difference data U2 (U2=−0.3P2[R]−0.6P2[G]+ 0.9P2 1[B]) by combining the second primary color data by a ratio of −3:−6:9 and produce second color difference data V2 (V1=0.7P2[R]−0.6P2[G]−0.1P2[B]) by combining the first primary color data by a ratio of 7:−6:−1. This method reduces the computation step. This method reduces the computation step of the second color difference calculator 27.

The first pseudo signal suppressor 28 attenuates the first color difference data U1 and V1 from the first color difference calculator 26 when any of the color component data C[Ye], C[Cy], C[G] and C[W] reaches (or comes close to) the saturation level. The second pseudo signal suppressor 29 attenuates the second color difference data U2 and V2 from the second color difference calculator 27 when any of the color component data C[Ye], C[Cy], C[G] and C[W] reaches (or comes close to) the saturation level. When any of the color component data C[Ye], C[Cy], C[G] and C[W] reaches the saturation level, the first and second color calculators 22 and 23 do not perform accurate color computations. In this case, pseudo signals having color component values different from the values of the original color components of a target object are generated. When the level of any of the color component data C[Ye], C[Cy], C[G] and C[W] exceeds a predetermined suppression reference level close to the saturation level, therefore, the first and second color difference data U1, V1, U2 and V2 are attenuated to prevent generation of pseudo signals.

The synthesizing circuit 30 combines the first color difference data U1 and V1 and the second color difference data U2 and V2 by predetermined ratios in accordance with a luminance level L provided from the luminance calculator 31, to generate color difference data U and V. The combining ratio of the first color difference data U1 and V1 for which the W component is not used in the color computation is set high when the brightness of the target object is relatively high. The combining ratio of the second color difference data U2 and V2, which are not easily affected by the noise component in the color computation, is set high when the brightness of the target object is relatively low.

The luminance calculator 31 combines the four color components from the color separator 21 to generate luminance data Y according to the following equation.

$$Y=Ye+Cy+G+W=(B+G)+(R+G)+G+(R+G+B) =2R+4G+2B$$

The luminance calculator 31 produces the luminance level L representing the levels of the four color components by averaging the luminance data Y, area by area which has been previously defined by the proper number of light-receiving pixels, and supplies the luminance level L to the synthesizing circuit 30. The luminance level L may be produced pixel by pixel in which case upper bits of the luminance data Y are extracted as the luminance level L.

The aperture circuit 32 enhances a specific frequency component included in the luminance data Y from the luminance calculator 31 to enhance the outline of the image of the target object.

As mentioned above, the color difference data U and V are produced by combining two kinds of color difference data or the first and second color difference data U1 and V1, and U2 and V2. Even when a computation error occurs in one color computation, therefore, the influence of the error hardly affects the reproduced image. Since the combining ratio of the color difference data that are likely to cause a computation error is set small in accordance with the luminance level of a target object, the influence of the computation error becomes smaller.

Figure 6:
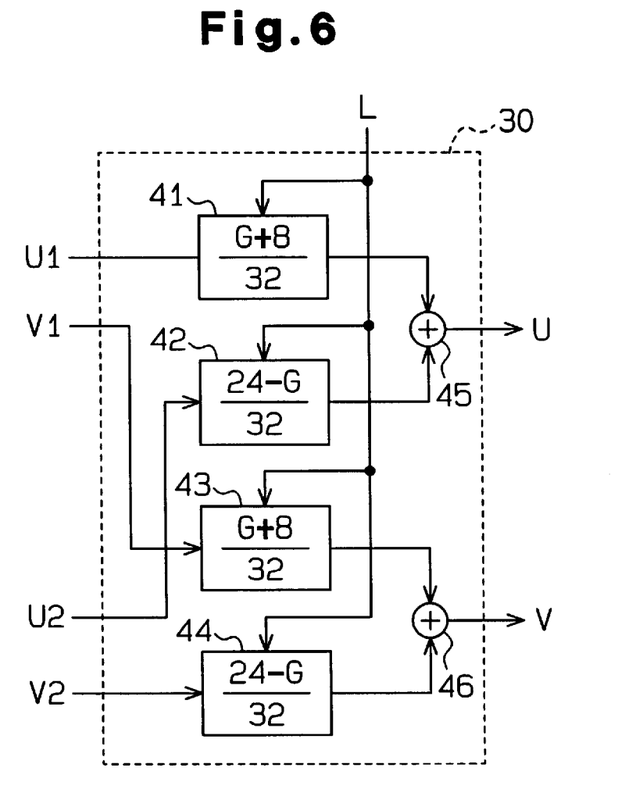
FIG. 6 is a schematic block diagram of a synthesizing circuit of the image signal processing apparatus of FIG. 5.
Figure 7:
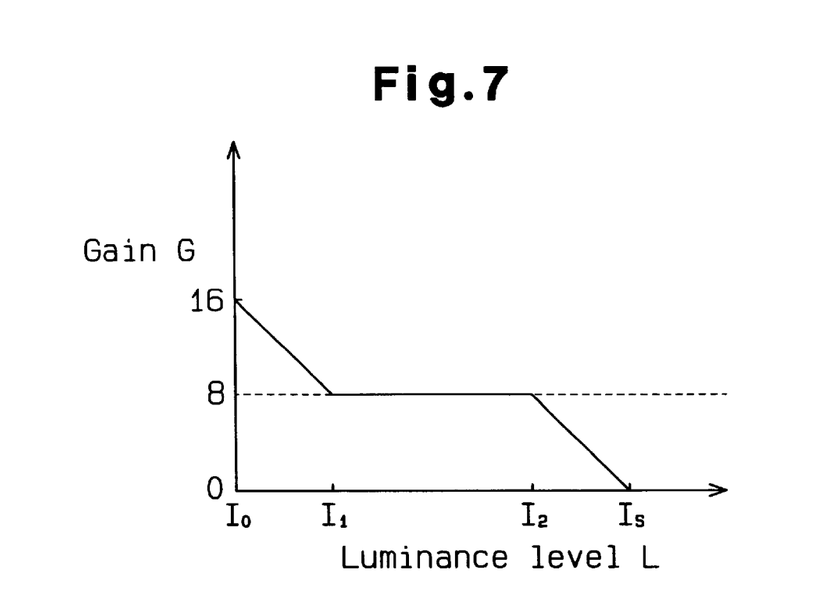
FIG. 7 is a graph showing a relationship between the gain set by the synthesizing circuit of FIG. 6 and the luminance level.

FIG. 6 is a schematic block diagram of the synthesizing circuit 30. FIG. 7 presents a graph showing a relationship between the luminance level of a target object and the value of the gain that determines the combining ratio of the color difference data. The synthesizing circuit 30 has first to fourth multipliers 41 to 44 and first and second adders 45 and 46. The first multiplier 41 performs multiplication of the following equation on the color difference data U1 from the first pseudo signal suppressor 28.

$$U1*(G+8)/32$$

The third multiplier 43 performs multiplication of the following equation on the color difference data V1 from the first pseudo signal suppressor 28.
$$V1*(G+8)/32$$

The second multiplier 42 performs computation of the following equation on the color difference data U2 from the second pseudo signal suppressor 29.

$$U2*(24-G)/32$$

The fourth multiplier 44 performs computation of the following equation on the color difference data V2 from the second pseudo signal suppressor 29.

$$V2*(24-G)/32$$

In the aforementioned equations, G is the gain that is determined in accordance with the luminance level L. The relationship between the luminance level L and the gain G is illustrated in FIG. 7.

The first adder 45 adds the output of the first multiplier 41 and the output of the second multiplier 42 to generate the color difference data U. The second adder 46 adds the output of the third multiplier 43 and the output of the fourth multiplier 44 to generate the color difference data V. In other words, the color difference data U and V are acquired from the following equations.

$$U=(U1*(G+8)+U2*(24-G))/32$$

$$V=(V1*(G+8)+V2*(24-G))/32$$

As shown in FIG. 7, the gain G is set to decrease with an increase in the luminance level L. That is, the gain G is set such that the combining ratio of the first color difference data U1 and V1 increases when the luminance level L is low, and the combining ratio of the second color difference data U2 and V2 increases when the luminance level L is high. When the luminance level L is at its lowest level of 10, for example, the gain G is set equal to 16 so that the combining ratios of the first color difference data U1 and V1 and the second color difference data U2 and V2 become 3:1. While the luminance level L is between a first level of 11, which is higher than the lowest level of 10, and a second level of 12, the gain G is set equal to about 8 so that the combining ratios of the first color difference data U1 and V1 and the second color difference data U2 and V2 become 1:1. When the luminance level L is higher than the second level of 12, the gain G is decreased to increase the combining ratio of the second color difference data U2 and V2. When the luminance level L is at a saturation level LS, the gain G is set equal to 0 so that the combining ratios of the first color difference data U1 and V1 and the second color difference data U2 and V2 become 1:3. As apparent from the above, the desired color difference data U and V are acquired irrespective of the luminance level, by properly changing the combining ratios of the first color difference data U1 and V1 and the second color difference data U2 and V2.

Figure 8:
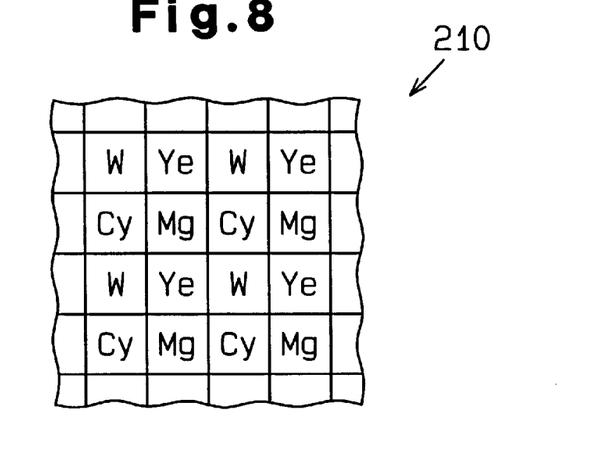
FIG. 8 is a schematic plan view of a part of a color filter.
Figure 9:
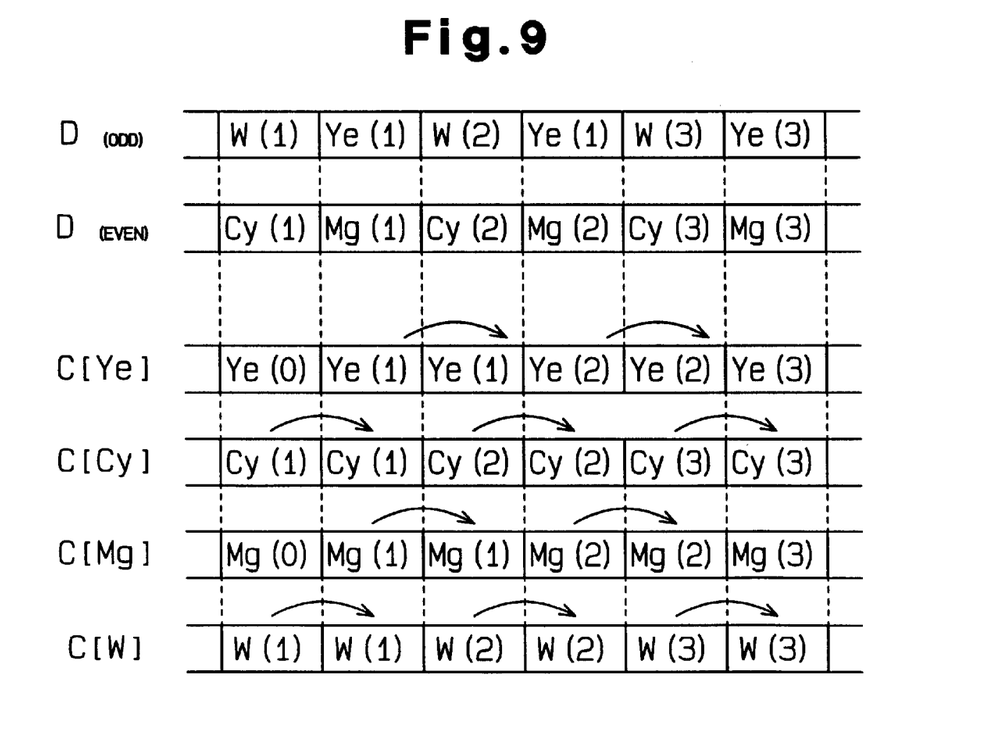
FIG. 9 is a timing chart for processing image data using the color filter of FIG. 8.

A color filter 210 which comprises segments of Ye (Yellow), Mg (Magenta), Cy (Cyan) and W (White) as shown in FIG. 8, may be used. In the color filter 210, the W components and Ye components are alternately arranged in odd rows, and the Cy components and Mg components are alternately arranged in even rows. Therefore, the image data D having a series of alternate W and Ye components is output in the operation of reading odd rows of the image sensing device, and the image data D having a series of alternate Cy and Mg components is output in the operation of reading even rows.

Referring now to FIG. 5 and 8, an alternate embodiment of the present invention is described. The color separator 21 separates the image data D and outputs color component data C[Ye], C[Mg], C[Cy] and C[W]. The first color calculator 22 performs a color computation according to, for example, the following equations on the color component data C[Ye], C[Mg], C[Cy] and C[W] to produce the first primary color data P1[R], P1[B] and P1[G].

(Ye+Mg−Cy)/2=R (Mg+Cy−Ye)/2=B (Cy+Ye−Mg)/2=G

The second color calculator 23 executes a color computation according to the following equations to produce the second primary color data P2[R], P2[B] and P2[G].

W−Cy=R

W−Ye=B

W−Mg=G

The processes of the first and second color balance controllers 24 and 25, the first and second color difference calculators 26 and 27, and the first and second pseudo signal suppressors 28 and 29 are carried out in the same way as done for the primary color data P1[R], P1[B], P1[G], P2[R], P2[B] and P2[G]. Even when any of the color component data C[Ye], C[Mg], C[Cy] and C[W] saturates, therefore, generation of a pseudo signal having a large level is prevented. This invention can be adapted to a color filter which is formed by combining other color segments. This invention is not limited to two kinds of color computations, but may be embodied into an image signal processing apparatus, which generates color difference data by performing three or more kinds of color computations and combines those color difference data by predetermined ratios.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An image signal processing apparatus for generating color difference output signals using a plurality of color component signals, comprising:

a first color calculator for performing a first color computation on the plurality of color component signals to generate first primary color signals corresponding to three primary colors of light;

a second color calculator for performing a second color computation on the plurality of color component signals to generate second primary color signals corresponding to the three primary colors of light;

a first color difference calculator for generating first color difference signals using the first primary color signals;

a second color difference calculator for generating second color difference signals using the second primary color signals; and a synthesizing circuit for combining the first color difference signals and the second color difference signals by predetermined ratios, color component by color component, to generate the color difference output signals.

2. The image signal processing apparatus according to claim 1, further comprising an intensity detector for detecting levels of the plurality of color component signals, wherein the synthesizing circuit changes the predetermined combining ratios of the first color difference signals and the second color difference signals in accordance with the levels detected by the intensity detector.

3. The image signal processing apparatus according to claim 1, further comprising:

a first color balance controller, connected between said first color calculator and said first color difference calculator, for adjusting a color balance with respect to the first primary color signals and supplying the adjusted first primary color signals to said first color difference calculator; and a second color balance controller, connected between said second color calculator and said second color difference calculator, for adjusting a color balance with respect to the second primary color signals and supplying the adjusted second primary color signals to said second color difference calculator.

4. The image signal processing apparatus according to claim 1, further comprising:

a first pseudo signal suppressor, connected between said first color difference calculator and said synthesizing circuit, for attenuating the first color difference signals and supplying the attenuated first color difference signals to said synthesizing circuit when a level of at least one of the plurality of color component signals and the first primary color signals exceeds a first predetermined level; and a second pseudo signal suppressor, connected between said second color difference calculator and said synthesizing circuit, for attenuating the second color difference signals and supplying the attenuated second color difference signals to said synthesizing circuit when a level of at least one of the plurality of color component signals and the second primary color signals exceeds a second predetermined level.

5. An image signal processing apparatus for generating color difference output signals using a plurality of color component signals, comprising:
- a plurality of color calculators for performing a plurality of color computations on the plurality of color component signals to generate plural sets of primary color signals, each set corresponding to three primary colors of light;
- a plurality of color difference calculators for generating plural sets of color difference signals using the plural sets of primary color signals; and
- a synthesizing circuit for combining the plural sets of color difference signals by predetermined ratios, color component by color component, to generate the color difference output signals.

6. The image signal processing apparatus according to claim 5, further comprising an intensity detector for detecting levels of the plurality of color component signals, wherein the synthesizing circuit changes the predetermined combining ratios of the plurality of color component signals in accordance with the levels detected by the intensity detector.

* * * * *

UNITED STATES PATENT AND TRADEMARK OFFICE
CERTIFICATE OF CORRECTION

PATENT NO.   : 6,160,593
DATED        : December 12, 2000
INVENTOR(S)  : Toshio NAKAKUKI It is certified that error appears in the above-identified patent and that said Letters Patent is hereby corrected as shown below:

[73]   Assignee:   Sanyo Electric Co., Ltd., Osaka, Japan

Signed and Sealed this

First Day of May, 2001

Attest:

NICHOLAS P. GODICI

Attesting Officer            Acting Director of the United States Patent and Trademark Office

UNITED STATES PATENT AND TRADEMARK OFFICE
CERTIFICATE OF CORRECTION

PATENT NO. : 6,160,593
DATED : December 12, 2000
INVENTOR(S) : Toshio Nakakuki

It is certified that error appears in the above-identified patent and that said Letters Patent is hereby corrected as shown below:

Column 6,
Line 22, please delete "C[w]" and insert -- C[W] -- therefor.
Line 39, please delete "C[w]" and insert -- C[W] -- therefor.

Signed and Sealed this

Sixth Day of November, 2001

Attest:

NICHOLAS P. GODICI
Attesting Officer   Acting Director of the United States Patent and Trademark Office

UNITED STATES PATENT AND TRADEMARK OFFICE
CERTIFICATE OF CORRECTION

PATENT NO.   : 6,160,593
DATED        : December 12, 2000
INVENTOR(S)  : Toshio Nakakuki

It is certified that error appears in the above-identified patent and that said Letters Patent is hereby corrected as shown below:

Column 6,
Line 21, please delete "C[w]" and insert -- C[W] -- therefor.
Line 39, please delete "C[w]" and insert -- C[W] -- therefor.

This certificate supersedes Certificate of Correction issued November 6, 2001

Signed and Sealed this

Sixth Day of May, 2003

JAMES E. ROGAN
*Director of the United States Patent and Trademark Office*